United States Patent [19]
Taomo et al.

[11] Patent Number: 6,014,811
[45] Date of Patent: Jan. 18, 2000

[54] POWER CUTTER

[75] Inventors: Toshio Taomo; Wang Yan Song, both of Tokyo, Japan

[73] Assignee: Kioritz Corporation, Tokyo, Japan

[21] Appl. No.: 09/023,798

[22] Filed: Feb. 13, 1998

[30] Foreign Application Priority Data

Feb. 14, 1997 [JP] Japan ..................................... 9-030794

[51] Int. Cl.[7] .................................................. B23D 45/16
[52] U.S. Cl. ........................... 30/124; 30/390; 125/13.01
[58] Field of Search ............................. 30/124, 122, 391, 30/388–390; 125/13.01

[56] References Cited

U.S. PATENT DOCUMENTS

| | | | |
|---|---|---|---|
| 1,990,991 | 2/1935 | Heubach | 30/124 X |
| 5,235,753 | 8/1993 | Stumpf | 30/391 |

FOREIGN PATENT DOCUMENTS 714570  7/1992  Japan .

*Primary Examiner*—Douglas D. Watts
*Attorney, Agent, or Firm*—Baker & Botts, L.L.P.

[57] ABSTRACT

A power cutter is disclosed which is capable of selectively changing the discharge direction of dust discharged from a dust discharge port of a dust suction-discharge fan and, hence, which is capable of optimally adjusting the dust discharge direction according to the operational condition or operational position of the power cutter. An elbow-shaped auxiliary discharge pipe is coupled to the dust discharge port of the dust suction-discharge fan in such a manner that it can be turned and kept at any turned position. In addition, a belt tensioning clutch is provided to permit selective connection and disconnection of the belt drive transmission between the power source and the dust section-discharge fan. This permits fan operation to be interrupted when not needed.

1 Claim, 5 Drawing Sheets

POWER CUTTER

BACKGROUND OF THE INVENTION

1. Field of the Invention

The present invention relates to a portable power cutter comprising a prime mover such as a small air-cooled two-cycle gasoline engine or an electric motor. More particularly, the invention relates to a power cutter comprising a dust suction-discharge fan for discharging by sucking dust resulting from cutting operations with cutting means such as a cutter blade.

2. The Prior Art

In portable power cutters of this type, there has heretofore been proposed and used a body or frame carrying a prime mover, an operative cutting component attached to the frame and including cutting means such as a cutter blade, a safety cover, etc., and a dust suction-discharge fan mounted on the operative cutting component for discharging by sucking dust resulting from cutting operations on a concrete-formed material or the like.

In such conventional portable power cutters, the cutting means is driven to rotate by the prime mover via a belt-type driving mechanism. The driving force of the prime mover is also transmitted to the dust suction-discharge fan via another belt-type mechanism to rotationally drive the dust suction-discharge fan.

In the conventional power cutters, however, the direction of the dust discharge port of the dust suction-discharge fan is not changeable, and thus the dust discharge direction is fixed. Accordingly, there are problems in certain operational conditions or operational positions that dust discharge from the fan is likely to strike the operator, and that a dust collecting bag, a pipe or hose or the like, which is connected to the discharge port, can be an obstacle to operation.

Further, in the conventional power cutter, when the cutting means is driven to rotate, the dust suction-discharge fan is also inevitably driven to rotate. Accordingly, there is a problem that even in cutting operations which require a strong driving force for cutting and from which significant levels of dust do not result, as, for example, in the cutting of an iron pipe, the dust suction-discharge fan is nevertheless ceaselessly driven to rotate, leading to waste of power of the prime mover.

SUMMARY OF THE INVENTION

The present invention has been made in view of the above-described problems. It is, therefore, an object of the present invention to provide a power cutter which is designed to be capable of changing the direction of dust discharged from a discharge port of a dust suction-discharge fan and, hence, capable of optimally adjusting the dust discharge direction according to operational conditions or operational positions.

It is another object of the present invention to provide a power cutter which is designed to allow arbitrary connection and disconnection of the power transmission from a prime mover to a dust suction-discharge fan to thereby prevent power of the prime mover from being wasted.

To achieve the above objectives, a portable power cutter according to the present invention basically comprises:

a body carrying a prime mover, an operative cutting component having cutting means such as a cutter blade, and a dust suction-discharge fan for discharging by sucking dust resulting from cutting operations carried out by means of the cutting means.

The portable power cutter is characteristically provided with dust discharge direction changing means attached to the dust discharge port of the dust suction-discharge fan for rendering the dust discharge direction changeable.

As the discharge direction changing means, one embodiment comprises an elbow-shaped auxiliary discharge pipe attached to the dust discharge port in such a manner that it can be turned and held, i.e., maintained, at any turned position.

In a portable power cutter according to the present invention constructed as described above, the elbow-shaped auxiliary discharge pipe is attached to the dust discharge port of the dust suction-discharge fan in such a manner that it can be turned and maintained at any turned position. Accordingly, the direction of dust discharged from the discharge port of the dust suction-discharge fan can be changed, and thus the dust discharge direction can be optimally adjusted according to the operational conditions or operational position of the power cutter.

In another embodiment of a portable power cutter according to the present invention, the driving force of the prime mover is transmitted to the dust suction-discharge fan via a belt-type driving mechanism which, to permit arbitrary connection and disconnection of power transmission, is provided with a belt tensioning clutch.

In such a power cutter according to the present invention, power transmission from the prime mover to the dust suction-discharge fan can therefore be arbitrarily connected or disconnected, thereby preventing the power of the prime mover from being wasted. This leads to improved energy efficiency and operational efficiency.

DESCRIPTION OF PREFERRED EMBODIMENTS

In the following, preferred embodiments of the present invention will be described with reference to the accompanying drawings.

Figure 1:
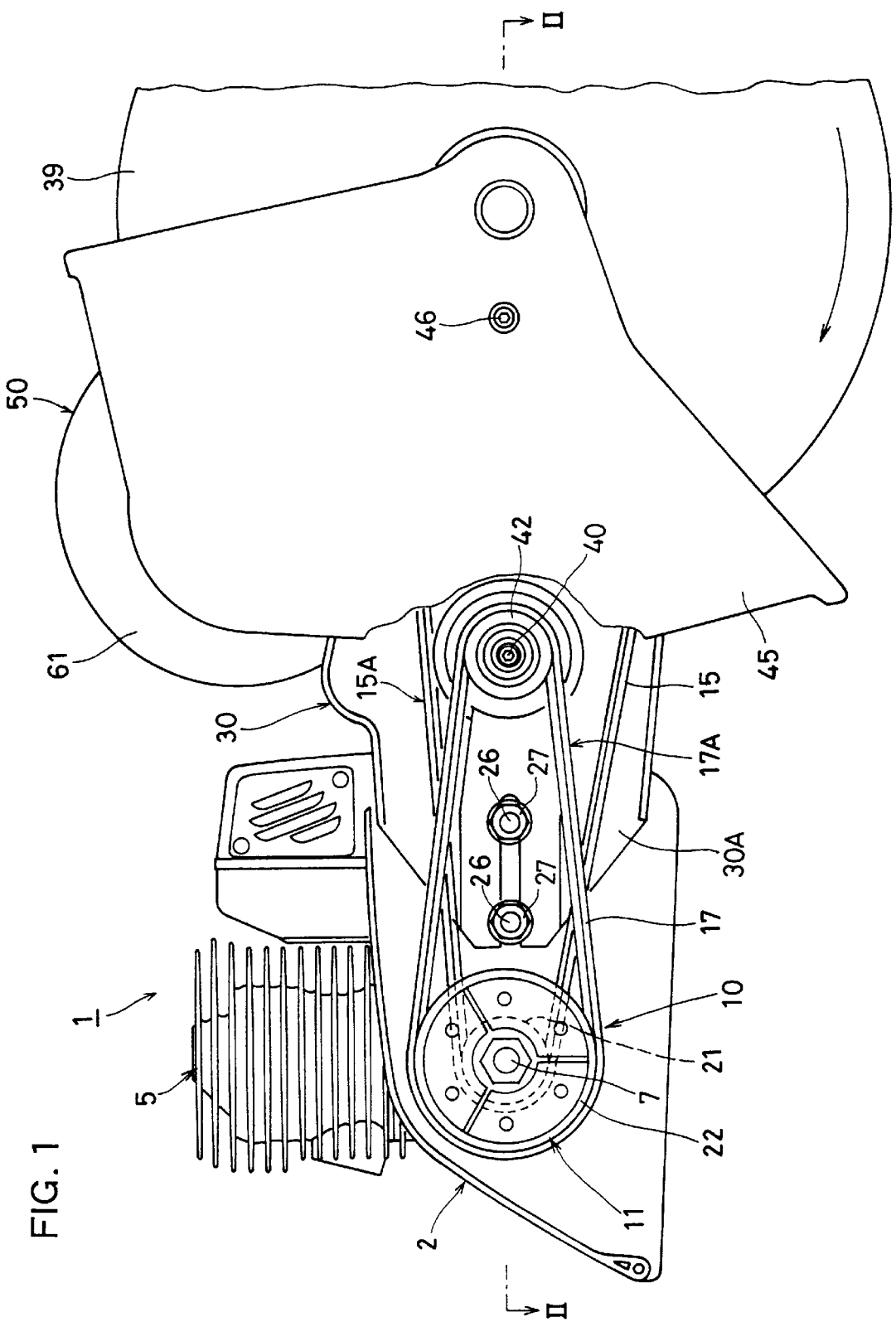
FIG. 1 is a side view showing a main portion of an embodiment of a power cutter according to the present invention.
Figure 2:
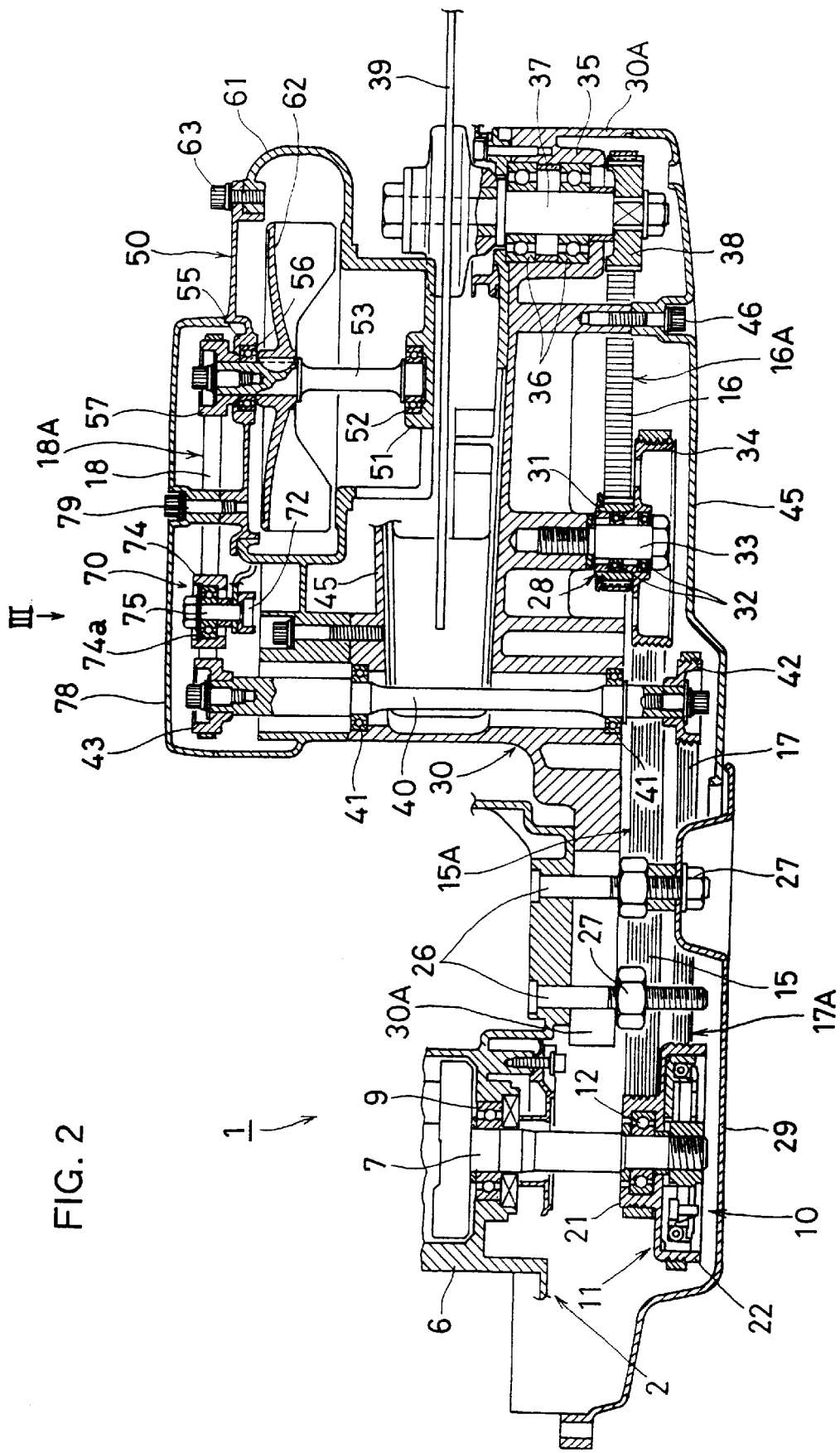
FIG. 2 is a sectional view taken along the line II—II and viewed in the direction of arrows in FIG. 1.

FIGS. 1 and 2 show the main part of an embodiment of a so-called engine-operated cutter as the portable power cutter according to the present invention, in which a handle frame, etc. are not shown.

The engine-operated cutter 1 shown in FIGS. 1 and 2 comprises a frame 2 and a small air-cooled two-cycle gasoline engine (hereinafter referred to simply as engine) 5 as a prime mover approximately centrally disposed on the frame 2. A rear handle provided with a throttle trigger or the like is attached to the frame 2 at the back thereof and a front handle is so mounted on the frame 2 as to extend upward and forward from a lower center part thereof, although these handles are not shown.

The engine 5 comprises a crank case 6 and a crank shaft 7 journal-supported by the crank case 6 via ball bearings 9

(see FIG. 2). A centrifugal clutch 10, which is conventional, is provided on the distal end of the crank shaft 7.

The centrifugal clutch 10 has a clutch drum 11 integrally composed of an expanded portion formed as a large diameter pulley portion 22 for a V ribbed belt 17 and a boss portion formed as a small diameter pulley portion 21 for a V ribbed belt 15. A ball bearing 12 is interposed between the clutch drum 11 and the crank shaft 7. When the centrifugal clutch 10 is actuated, rotational driving force from the crank shaft 7 is transmitted to the clutch drum 11.

An operative cutting component 30, having a disc-shaped cutter blade 39 as cutting means, is mounted on the frame 2. A protective cover 29 is so attached to the frame 2 as to cover the clutch drum 11 in the form of the two-step pulley and vicinities thereof. A rear portion of the operative cutting component 30 and the protective cover 29 are detachably attached to the body 2 by means of stud bolts 26 and nuts 27.

Figure 5:
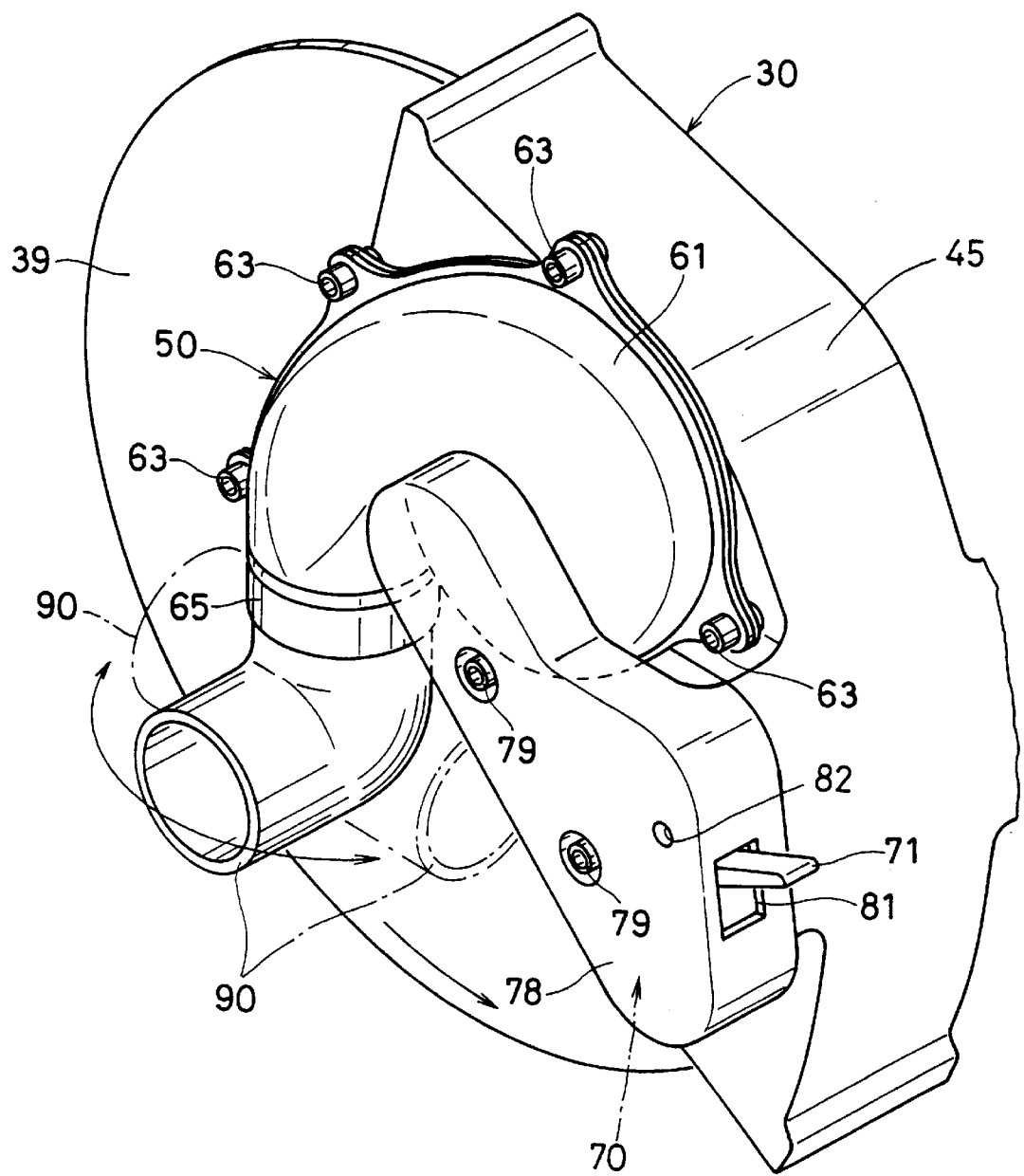
FIG. 5 is a perspective view showing an operative cutting component of the portable power cutting machine shown in FIG. 1.

The operative cutting component 30 comprises a supporting member 30A having a box-like structure, a substantially fanshaped (sector-shaped) safety cover 45 attached to the supporting member 30A by a bolt 46, the disc-shaped cutter blade 39 as cutting means substantially centrally disposed when viewed in plan, and a dust suction-discharge fan 50 disposed on the left side (upper side in FIG.2) of the cutter blade 39 (see FIG.5).

A first belt-type driving mechanism 15A for the cutting means and a second belt-type driving mechanism 16A for the cutting means are provided between the frame 2 and the supporting member 30 for transmitting the rotational driving force of the engine 5 to the cutter blade 39. A first belt-type driving mechanism 17A for the dust suction-discharge fan 50 and a second belt-type driving mechanism 18A for the dust suction-discharge fan 50 are likewise provided for transmitting the rotational driving force of the engine 5 to a vane wheel 62 of the dust suction-discharge fan 50.

The first belt-type driving mechanism 15A for the cutting means includes the small diameter pulley portion 21 formed on the clutch drum 11, a large diameter pulley 34 for a V ribbed belt of a two-step relay pulley 28, which is composed integrally of the large diameter pulley 34 having a diameter larger than that of the small diameter pulley portion 21 and a smaller relay pulley 31, and which is rotatably mounted on a relay shaft 33 fixed to the supporting member 30A via ball bearings 32, and the V ribbed belt 15 having a relatively large width and laid over the small diameter pulley portion 21 and the large diameter pulley 34.

The second belt-type driving mechanism 16A for the cutting means includes the toothed relay pulley 31 of the two-step relay pulley 28, whose diameter is smaller than that of the large diameter pulley 34, and a toothed end pulley 38 having a diameter larger than that of the small diameter toothed relay pulley 31 and fixedly fitted to one end of a rotatable shaft 37, to the other end of which the cutter blade 39 is fixedly mounted. The rotatable shaft 37 is journal-supported via ball bearings 36, 36 by a shaft receiving portion 35 formed in a front end portion of the supporting member 30A. The driving mechanism 16A also includes a toothed timing belt 16 laid over the relay pulley 31 and the end pulley 38.

Thus, the rotational driving force of the engine 5 is transmitted to the cutter blade 39 via the first belt-type driving mechanism 15A for the cutting means, which comprises the small diameter pulley 21, the V ribbed belt 15 and the large diameter pulley 34, and the second belt-type driving mechanism 16A for the cutting means, which comprises the relay pulley 31 integrated with the large diameter pulley 34, the timing belt 16 and the end pulley 38. Accordingly, the cutter blade 39 is driven by the engine 5 to rotate at a rotational speed double-reduced by the first and second belt-type driving mechanisms 15A, 16A; for example, at about 3,500 rpm.

The first belt-type driving mechanism 17A for the dust suction-discharge fan 50 comprises the large diameter pulley portion 22 formed in the clutch drum 11, a small diameter pulley 42 for a V ribbed belt 17, which is fixedly fitted on one end of a relay shaft 40 that is journal-supported by the supporting member 30A via ball bearings 41. The diameter of the small diameter pulley 42 is smaller than that of the large diameter pulley portion 22. The driving mechanism 17A also includes the V ribbed belt 17 having a relatively small width and laid over the large pulley portion 22 and the small diameter pulley 42.

The second belt-type driving mechanism 18A for the dust suction-discharge fan 50 comprises a relay pulley 43 fixedly fitted on the other end of the relay shaft 40, an end pulley 57 having a diameter substantially the same as or slightly smaller than that of the relay pulley 43 and fixedly fitted on a rotatable shaft 53 on which the vane wheel 62 is also fixed. The rotatable shaft 53 is journal-supported by shaft receiving portions 51, 55 formed in a fan casing 61 of the dust suction-discharge fan 50 via ball bearings 52, 56, respectively. The driving mechanism 18A also includes a flat belt 18 laid over the relay pulley 43 and the end pulley 57.

Thus, rotational driving force of the engine 5 is transmitted to the vane wheel 62 via the first belt-type driving mechanism 17A, which comprises the large diameter pulley portion 22, the V ribbed belt 17 and the small diameter pulley 42, and the second belt-type driving mechanism 18A, which comprises the relay pulley 43, the flat belt 18 and the end pulley 57. Accordingly, the vane wheel 62 is driven by the engine 5 to rotate at an increased speed, to a level of, for example, about 20,000 rpm, by means of the first and second belt-type driving mechanisms 17A, 18A.

Figure 3:
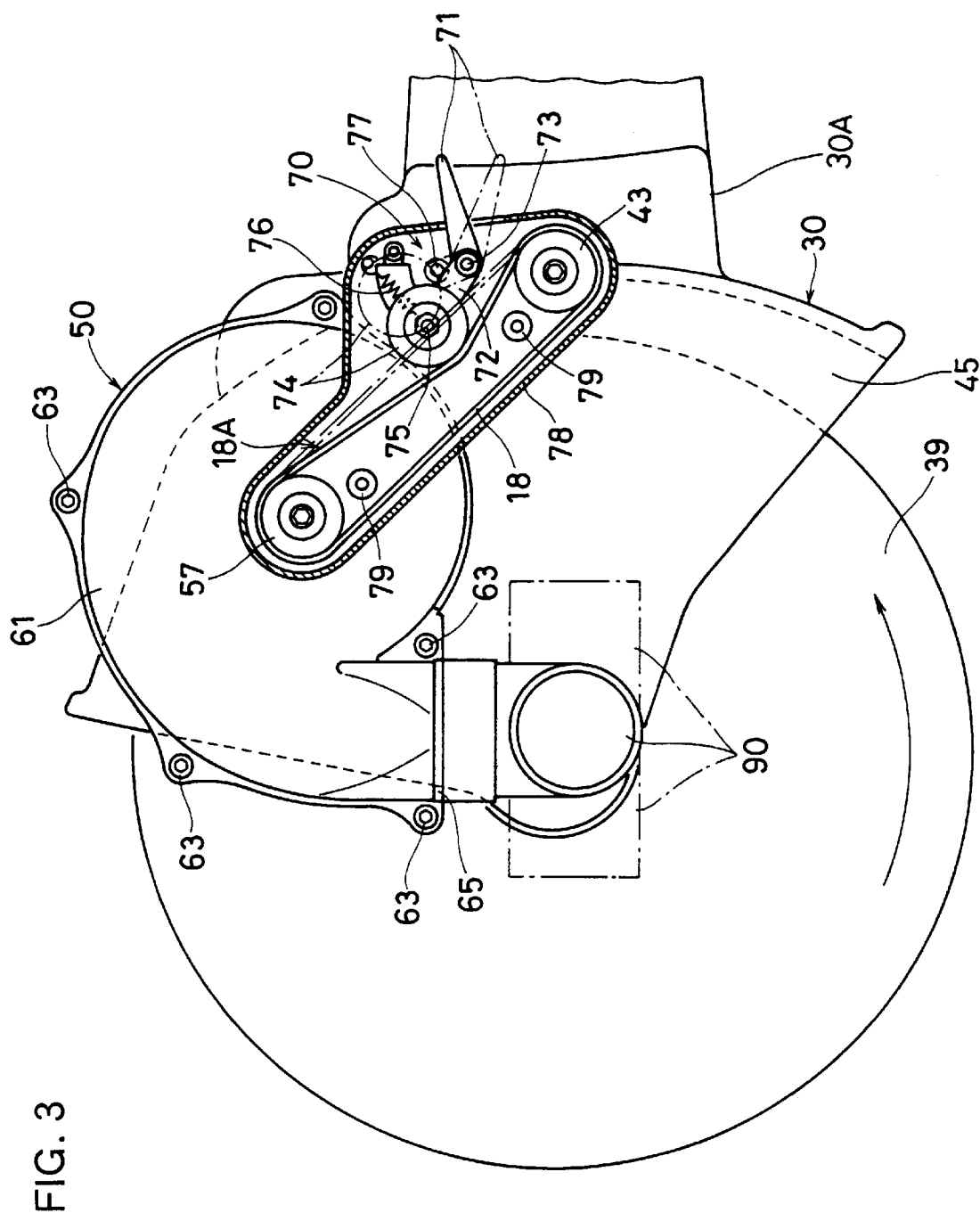
FIG. 3 is a partly sectional fragmentary side view viewed in the direction of arrow III in FIG. 2.
Figure 4:
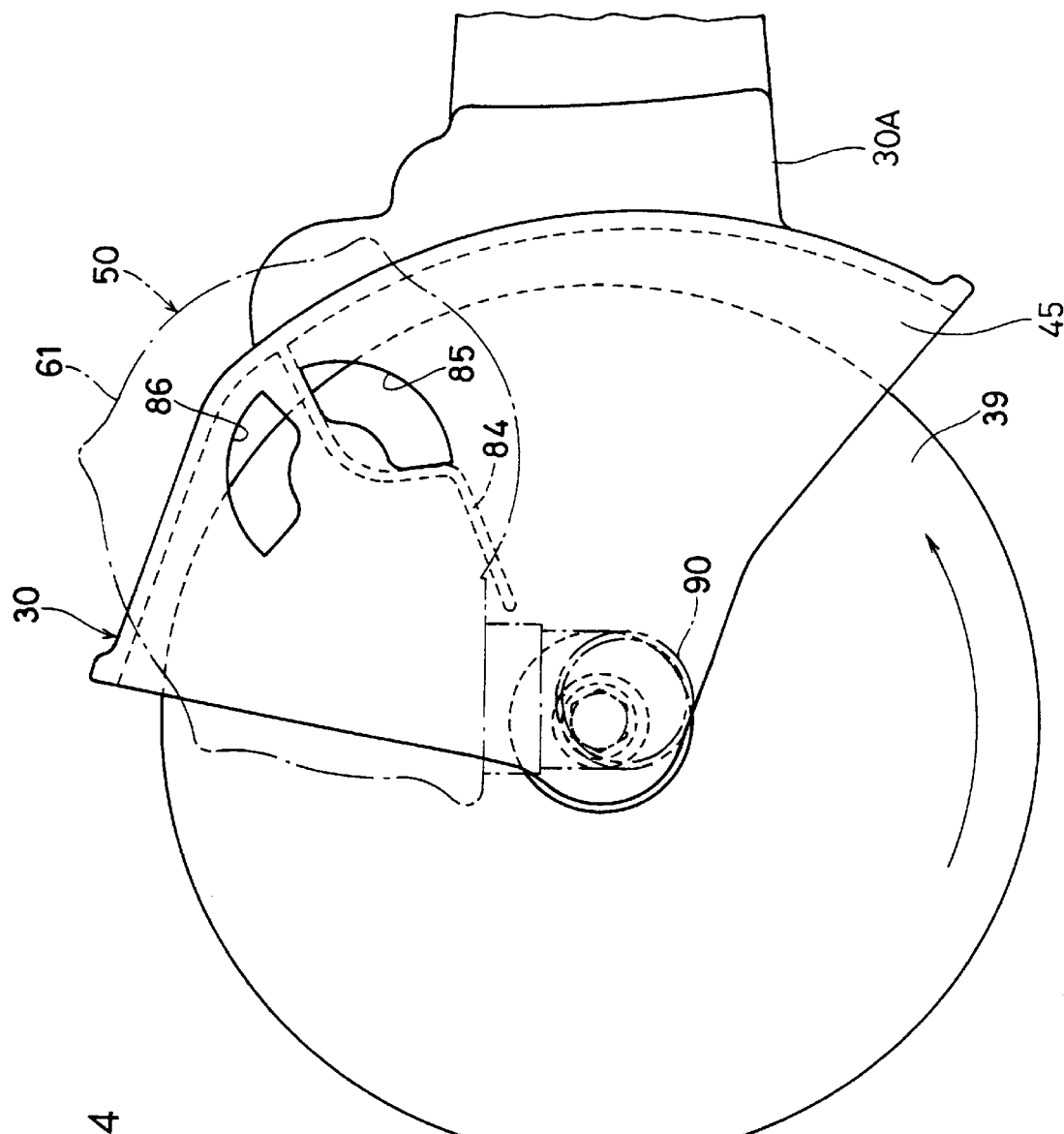
FIG. 4 is a view similar to FIG. 3 with a dust suction-discharge fan-related portion removed therefrom.

As shown in FIG. 3, the dust suction-discharge fan 50, including the vane wheel 62, is provided with the fan casing 61 attached to the supporting member 30A. As is clearly shown in FIG. 4, a dust guide partition 84 is provided on an inner side of the safety cover 45. A main suction opening 85 and an auxiliary suction opening 86 for sucking dust resulting from cutting operations by means of the cutter blade 39 are provided in a portion of the safety cover 45, which substantially corresponds to the center portion of the fan casing 61, with the partition 84 interposed therebetween.

Further, to allow arbitrary connection and disconnection of the power transmission from the engine 5 to the vane wheel 62 of the dust suction-discharge fan 50, the second belt-type driving mechanism 18A therefor is provided with a belt tension clutch 70 (see FIG. 3).

The belt tension clutch 70 comprises a control lever 71 and a pivoted lever 72 which are pivotally fitted on a support pin 73 carried by the operative cutting component 30 in such a manner that they are fixed relative to each other in a dog-legged configuration. A tension roller 74 is rotatably supported by a pin 75 on the pivoted lever 72.

In the belt tension clutch 70, when the control lever 71 is turned counterclockwise in FIG. 3, the tension roller 74 is pressed against the flat belt 18 of the second belt-type driving mechanism 18A for the dust suction-discharge fan 50 to thereby apply a predetermined tension to the flat belt 18, thereby putting the second belt-type driving mechanism 18A in condition to perform power transmission.

To maintain the power transmissive condition, i.e., to prevent the tension roller 74 from being pushed back by the flat belt 18, a lock pin 77 is provided as lock means in such a manner that it is retractable into the operative cutting component 30. When the pivoted lever 72 is turned counterclockwise in FIG. 3 to the illustrated position (tension applying position), the lock pin 77 protrudes by spring action towards this side of FIG. 3 to block the pivoted lever 72 by the upper surface. If the lock pin 77 is pushed from this blocking condition into the operative cutting component 30, the blocking condition is removed. When the lock pin 77 is retracted from the blocking condition, the pivoted lever 72 is pivotally moved clockwise by a tension spring 76. The tension roller 74 is thereby withdrawn from contact with the flat belt 18, rendering the flat belt 18 slack. In consequence, the second belt-type driving mechanism 18A for the dust suction-discharge fan 50 is put out of condition to perform power transmission.

As shown in FIG. 5, a protective cover 78 is attached by bolts 79 or the like so as to cover the second belt-type driving mechanism 18A for the dust suction-discharge fan 50 and the belt tension clutch 70. The protective cover 78 is provided with an opening 81 for allowing the control lever 71 to be pivotally moved and with a tool inserting hole 82 for convenience of push-in operation of the lock pin 77.

As further shown in FIG. 5, an elbow-shaped auxiliary dust discharge pipe 90 is attached to a dust discharge port 65 of the fan 50 in such a manner that it can be turned and held at any turned position so as to allow the dust discharge direction to be changed according to the operational situation and the operational position of the machine. The elbow-shaped auxiliary discharge pipe 90 is turnable within an angular range of about 180 degrees between a forward-directed position and a backward-directed position (shown in FIG. 5 in phantom). It is kept at a turned position by means, for example, of a friction fit between it and the dust discharge port 65.

In the portable power cutter 1 according to the embodiment as described above, the elbow-shaped auxiliary discharge pipe 90 (as a dust discharge direction changing means) is attached to the dust discharge port 65 of the dust suction-discharge fan 50 in such a manner that it can be turned and kept at any turned position. Accordingly, the direction of dust discharge from the discharge port 65 of the fan 50 can be selectively changed. Hence, the dust discharge direction can optimally be adjusted according to the operational condition or the operational position of the machine.

In a further embodiment, the rotational driving force of the engine 5 is transmitted to the dust suction-discharge fan 50 via the first and second belt-type driving mechanisms 17A and 18A and, to allow arbitrary connection and disconnection of the power transmission by means of the second belt-type driving mechanism 18A, the second belt-type driving mechanism 18A is provided with the belt tension clutch 70. Accordingly, engine power may be conserved when operation of the fan 50 is not needed, thereby leading to improved fuel consumption efficiency and operational efficiency.

In the above, specific embodiments of the present invention have been described in detail. It will be understood, however, that the present invention is not restricted to the above-described embodiments, and that various modifications may be made within the spirit and scope of the invention as defined in the claims.

As will be understood from the above description, the power cutter of the present invention has an excellent effect that it is provided with dust discharge direction changing means such as an elbow-shaped auxiliary discharge pipe, and is thus capable of selective change in the discharge direction of dust discharged from the dust suction-discharge fan. Hence, the invention permits optimal adjustment of the dust discharge direction according to the operational condition or the operational position of the machine.

The still further embodiment described above is designed to allow arbitrary connection and disconnection of power transmission from the prime mover to the dust suction-discharge fan, thereby attaining the advantageous effect that power of the prime mover is conserved and, consequently, energy efficiency and operational efficiency are improved.

We claim:

1. A power cutter, comprising:

a frame;

a prime mover mounted on said frame;

an operative cutting component having cutting means being driven by the prime mover;

a dust suction-discharge fan, having a dust discharge port, for discharging, by sucking, dust resulting from cutting operations by said cutting means;

a belt-type driving mechanism having a drive belt for coupling said prime mover to said dust suction-discharge fan; and a belt tension clutch for selectively tensioning or untensioning said drive belt to selectively connect and disconnect said prime mover from said dust discharge fan.

\* \* \* \* \*